United States Patent
Yonehana et al.

(10) Patent No.: US 7,799,112 B2
(45) Date of Patent: Sep. 21, 2010

(54) PRODUCTION METHOD OF PURE METAL/ALLOY SUPER-MICRO POWDER

(75) Inventors: Yasunori Yonehana, Hyogo (JP); Yoshinao Chisaki, Hyogo (JP); Fumitaka Tsukihashi, Chiba (JP)

(73) Assignees: Ishihara Chemical Co., Ltd., Hyogo (JP); JFE Mineral Company, Ltd., Tokyo (JP)

( * ) Notice: Subject to any disclaimer, the term of this patent is extended or adjusted under 35 U.S.C. 154(b) by 968 days.

(21) Appl. No.: 10/578,298

(22) PCT Filed: Nov. 5, 2003

(86) PCT No.: PCT/JP03/14097

§ 371 (c)(1),
(2), (4) Date: May 4, 2006

(87) PCT Pub. No.: WO2005/044488

PCT Pub. Date: May 19, 2005

(65) Prior Publication Data

US 2009/0139372 A1 Jun. 4, 2009

(51) Int. Cl.
B22F 9/28 (2006.01)
(52) U.S. Cl. ............................... 75/343; 75/359; 75/360
(58) Field of Classification Search ................... 75/343, 75/359, 360
See application file for complete search history.

(56) References Cited

U.S. PATENT DOCUMENTS 2,642,356 A * 6/1953 Beidler ......................... 75/343
2,642,357 A * 6/1953 Beidler ......................... 75/363
2,754,193 A * 7/1956 Graham et al. ................. 75/351
2,754,195 A * 7/1956 Reed et al. ..................... 75/345
2,762,700 A 9/1956 Brooks
4,383,852 A 5/1983 Yoshizawa
4,810,285 A * 3/1989 Otsuka et al. .................. 75/369
6,432,161 B1 * 8/2002 Oda et al. ...................... 75/363
2002/0184971 A1 12/2002 Myrick

FOREIGN PATENT DOCUMENTS

CN 1275103 11/2000

(Continued)

OTHER PUBLICATIONS

H.W. Richardson, "Copper Compounds", in Ullmann's Encyclopedia of Industrial Chemistry, Wiley-VCH Verlag, Jun. 15, 2000, p. 1-31.*

(Continued)

*Primary Examiner*—George Wyszomierski
*Assistant Examiner*—Mark L Shevin
(74) *Attorney, Agent, or Firm*—Greenblum & Bernstein, P.L.C.

(57) ABSTRACT

It is to propose a method of producing super-micro powders of pure metal-alloy in which cheap materials can be used and the production is efficient. In the production method of pure metal super-micro powder by heating a starting material containing a metal chloride and reducing the resulting vapor of the metal chloride with hydrogen gas, an elementary metal constituting the metal chloride is added to the starting material containing the metal chloride and a metal chloride having a large valence among metal chlorides having two or more valence is used as the metal chloride. Also, in the production method of alloy super-micro powder, a metal chloride is used as one to (number of all alloying components—1) alloying components in the starting material and an elemental metal is used as the other alloying component.

9 Claims, 3 Drawing Sheets

FOREIGN PATENT DOCUMENTS

| | | |
|---|---|---|
| JP | 59-093806 | 5/1984 |
| JP | 61-79706 | 4/1986 |
| JP | 62-090908 | 4/1987 |
| JP | 2000-345217 | 12/2000 |
| JP | 2001-223141 | 8/2001 |
| JP | 2001-345238 | 12/2001 |
| WO | 99/64191 | 12/1999 |

OTHER PUBLICATIONS

English Language Abstract of JP 62-090908, Nakaoka et al. Published Apr. 25, 1987.

English Language Abstract of JP 2001-223141, Oda et al. Published Aug. 17, 2001.

English Language Abstract of JP 2001-345238, Oda et al. Published Dec. 14, 2001.

English Language Abstract of JP 59-093806, Aoki et al. Published May 30, 1984.

English language Abstract of CN 1275103, Asai et al. Published Nov. 29, 2000.

English language Abstract of JP 61-79706, Uehara et al. Published Apr. 23, 1986.

* cited by examiner

PRODUCTION METHOD OF PURE METAL/ALLOY SUPER-MICRO POWDER

TECHNICAL FIELD

This invention proposes a method of producing pure metal and alloy super-micro powders used in an internal electrode for multilayered ceramic capacitor, an electrode for nickel-hydrogen cell and another electrode or the like.

BACKGROUND ART

A metal powder having an electric conductivity such as Ni, Cu, Ag or the like is used as a material forming an internal electrode for multilayered ceramic capacitor, a porous electrode for nickel-hydrogen secondary cell, a hollow porous electrode for fuel cell, an electrode for other electron parts, or the like. Particularly, metal super-micro powder having a particle size of not more than 0.4 μm is good in the paste nature and is possible to form a fine pattern of a conductor portion or thin the thickness thereof, so that it is rapidly increasing as a demand for the formation of conductors in an electron circuit.

As a production method of the metal super-micro powder are known an evaporation process in gas, an evaporation process in plasma, a vapor phase chemical reaction process, a reduction precipitation process in liquid phase and the like, and the development of these processes is proceeding in accordance with characteristics of particles, kind of metal, production scale and the like. Among them, the vapor phase chemical reaction process does not need an expensive apparatus and is considered to be advantageous in the cost and used in the production of the industrial scale.

The vapor phase chemical reaction process is a process wherein a metal compound having a low boiling point is evaporated to cause a thermal decomposition reaction or a reduction reaction to thereby precipitate particles from a vapor phase. In the production of the metal super-micro powder, a so-called vapor phase reduction method in which steam of a metal chloride is reduced by using a hydrogen gas is mainly applied. Because, the metal chloride is low in the boiling point and evaporable and is easily reduced to a metal by a reducing gas.

As the metal chloride constituting a starting material for the super-micro powder, a compound having a low valence is usually used even if the starting cost is somewhat high. For example, in case of producing Cu super-micro powder, CuCl is used as a starting material and subjected to a reduction reaction with hydrogen gas according to the following equation:

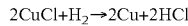

2CuCl+H$_2$→2Cu+2HCl to produce super-micro powder. When CuCl$_2$ having a valence larger than CuCl is used as a starting material, the material cost is cheap, but the reduction reaction proceeds at two stages as shown below, so that the reaction is complicated and the control thereof is difficult and hydrogen amount required for the reduction is 2 times and there is a problem that the production cost rather increases.

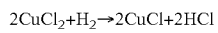

2CuCl$_2$+H$_2$→2CuCl+2HCl

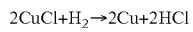

2CuCl+H$_2$→2Cu+2HCl

Therefore, if there is developed a technique capable of using a cheap and large valence. metal chloride instead of the expensive and low valence metal chloride as a starting material for the production of metal super-micro powder, it is possible to largely reduce the production cost.

Also, the vapor phase reduction process is utilized to not only the production of the metal single powder but also the production of alloy powder. As the method thereof are known 1) a method wherein metal chlorides as a target alloy component are previously mixed and the resulting mixture is heated to generate a mixed steam of the metal chlorides and reduced with a hydrogen gas;

2) a method wherein steams of metal chlorides as an alloy component are separately generated and these steams are introduced and mixed into a reaction tube and then reduced with a hydrogen gas, and the like. However, these methods have drawbacks that the cost of the starting material is high because the metal chloride having a low valence is used as the starting material but also the composition of the resulting alloy micro powder is not stable, and hence they have a problem in the practical use.

It is an object of the invention to propose a method of producing super-micro powder of a pure metal in which a cheap starting material can be used in a production method of metal super-micro powder through a vapor phase reduction process and powder can be efficiently produced. Also, it is another object of the invention to propose a cheap production method of alloy super-micro powder capable of cheaply and stably producing alloy super-micro powder having a desired composition.

DISCLOSURE OF THE INVENTION

The inventors have made various studies on the method of producing super-micro powder in which a cheap starting material containing a metal chloride of a so-called large valence is used instead of the conventionally used metal chloride for the purpose of lowering the cost of a vapor phase hydrogen-reduction process, which was said to be high in the production cost. As a result, it has been surprisingly found that the super-micro powder can be produced efficiently and cheaply by using a starting mixture of a metal compound having a large valence and a single metal body as compared with the case of using the expensive metal chloride having a small valence as the starting material in the conventional production method. Furthermore, it has been found that super-micro powder of binary, tertiary or more alloy can be produced more cheaply and stably by applying the above knowledge as compared with the conventional method. The invention is accomplished based on the above novel knowledge.

That is, the invention based on the above knowledge is a method of producing super-micro powder of a pure metal by heating a starting material containing a metal chloride and reducing the resulting metal chloride steam with a hydrogen gas to produce super-micro powder of a pure metal, characterized in that an elemental metal constituting the metal chloride is mixed with the starting material containing the metal chloride.

In the production method of the invention, as the metal chloride, it is preferable to use a metal chloride having a valence larger among metal chlorides having two or more valence. Also, the metal chloride is preferable to be cupric chloride (CuCl$_2$) or ferric chloride (FeCl$_3$).

Further, the invention is a method of producing super-micro powder of an alloy by heating a starting material containing a metal chloride and reducing the resulting metal chloride steam with hydrogen gas to form super-micro powder of an alloy, characterized in that a metal chloride is used as one to (number of all alloying components—1) alloying components in the starting material and an elemental metal is used as the other alloying component.

In the latter production method of the invention, the metal chloride is preferable to be cupric chloride ($CuCl_2$), cuprous chloride (CuCl), ferric chloride ($FeCl_3$), ferrous chloride ($FeCl_2$), nickel chloride ($NiCl_2$), cobalt chloride ($CoCl_2$) or stannous chloride ($SnCl_2$).

Also, in the production method of the invention, the elemental metal is preferable to be copper (Cu), iron (Fe), nickel (Ni), cobalt (Co), silver (Ag), tungsten (W), molybdenum (Mo), niobium (Nb), tantalum (Ta), chromium (Cr), vanadium (V), germanium (Ge) or antimony (Sb).

According to the invention of the above construction, as a starting material in the production of the super-micro powder of the pure metal through the vapor phase reduction method can be used the cheap metal chloride having a large valence and the elemental metal, so that the production cost can be largely reduced. Also, according to the invention, the super-micro powder of the alloy having a desired composition can be produced cheaply, efficiently and stably.

BEST MODE FOR CARRYING OUT THE INVENTION

Figure 1:
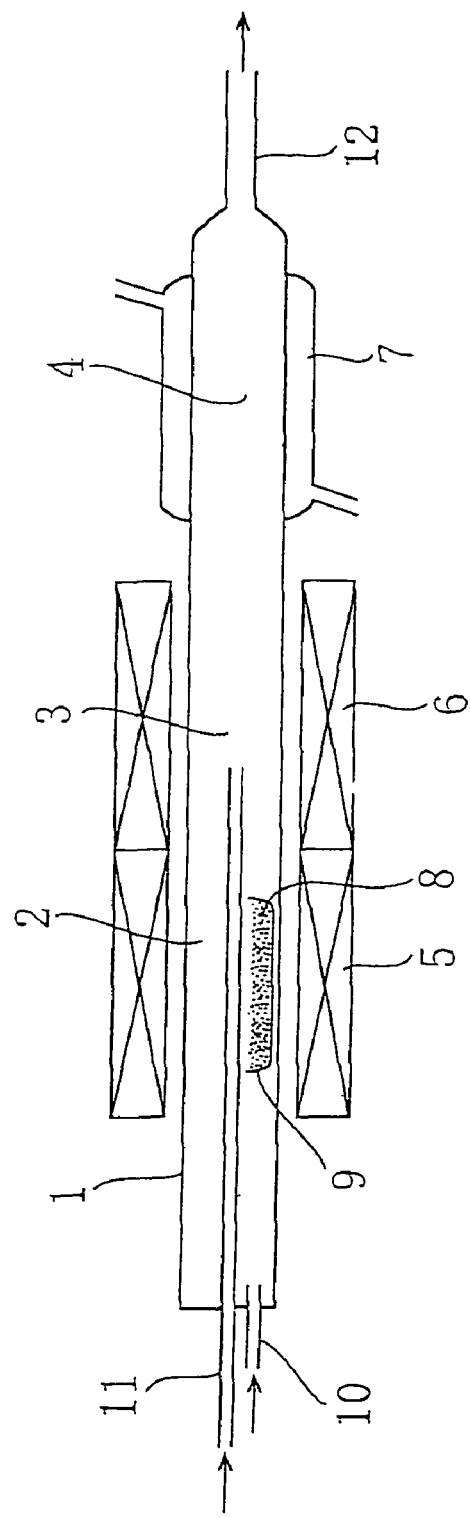
FIG. 1 is a schematic view showing a structure of an apparatus for producing super-micro metal powder.

The inventors have made studies on the method of producing super-micro powder of a metal from a metal chloride having a large valence through a vapor phase hydrogen reduction process by using a trial experiment apparatus having a horizontal type reactor shown in FIG. 1. The horizontal type reactor 1 in this apparatus comprises a starting material evaporation part 2 mainly heated from an outside of the reactor by heating furnaces 5, 6, a reduction part 3 and a cooling part 4 water-cooling an outer peripheral portion thereof by a cooler 7. A starting material 8 (metal chloride or the like) for metal super-micro powder to be produced is placed into an evaporation vessel 9, which is charged into the previously heated starting material evaporation part 2. The heated metal chloride is evaporated with the rise of the temperature and transported to the reduction part 3 with Ar gas flown from a carrier gas inlet port 10 located at a left side of the reactor, which is reduced by reacting with a hydrogen gas introduced from an inlet port 11 at the left side of the reactor to produce metal super-micro powder. The gas including the metal super-micro powder is cooled in the cooling part 4 and introduced through an outlet port 12 into a super-micro powder collecting part to recover the metal super-micro powder.

(Experiment 1)

The inventors have noticed that the amount of the resulting metal super-micro powder may be larger than the amount of the metal included in the starting material on the way of the studies. Also, it is guessed that the cause of the above results in the metal used in the inside of the reactor of the trial experiment apparatus for the metal super-micro powder shown in FIG. 1. That is, the cause on the above amount increase is considered due to the fact that vapor of the metal chloride generated from the starting material contacts and reacts with the metal inside the reactor to produce and evaporate a chloride of such a metal and further such a chloride reacts with hydrogen gas as a reducing gas to reduce the original metal, which is included in the metal super-micro powder to be targeted.

This is due to the fact that when the standard forming energy of the chloride of the metal used in the inside of the reactor is larger than the standard forming energy of the metal chloride used as the starting material, the metal reacts with the chlorine of the metal chloride as the starting material to migrate into a vapor phase as a chloride, while the metal chloride of the starting material advantageously precipitates as a metal in view of the energy.

In order to confirm the above presumption, therefore, the inventors have tried the reproduction of the above phenomenon by mixing finely cut pieces of metallic copper (Cu) plate with powder of cupric chloride ($CuCl_2$) and charging into the evaporation vessel for the starting material. The experimental conditions and results are shown in Table 1.

TABLE 1

| No. | Starting materials charged | | Evaporation temperature (° C.) | Reaction temperature (° C.) | Flow amount of carrier gas (l/min) | Flow amount of hydrogen gas (l/min) | Amount of resulting Cu powder (g) | Resulting Cu amount/ Cu amount in $CuCl_2$ (%) | Average particle size of powder (μm) |
| --- | --- | --- | --- | --- | --- | --- | --- | --- | --- |
| | Cupric chloride (g)* | Metallic Cu plate (g) | | | | | | | |
| 1 | 12.99 (Cu: 6.13) | 5.0 | 900 | 1000 | 4 | 3 | 9.99 | 163 | 0.35 |

*Numeral in parenthesis shows Cu amount in cupric chloride.

As seen from Table 1, the amount of the resulting Cu super-micro powder is larger than Cu amount included in cupric chloride ($CuCl_2$), from which it is confirmed that the inventors' presumption is correct. In this experiment, the amount of hydrogen gas flowed for obtaining the Cu super-micro powder is surprisingly equal to the amount conventionally flowed when the Cu super-micro powder is produced from cupric chloride ($CuCl_2$). That is, it has been confirmed that hydrogen gas is decreased by the increment of the amount of the resulting Cu super-micro powder. Moreover, the resulting super-micro powder has an average particle size of 0.35 μm, which is the same as the value in the conventional method.

From the results of this experiment, it is guessed that the above reduction reaction proceeds as follows. That is, the vapor of cupric chloride ($CuCl_2$) having a large valence and generated from the starting material evaporation vessel is reduced to cuprous chloride (CuCl) having a small valence by contacting with metallic Cu, while the metallic Cu is oxidized to produce cuprous chloride (CuCl). As a result, the resulting Cu super-micro powder is increased by the amount of cuprous chloride (CuCl) produced from metallic Cu. Further, in order to conduct the reduction of cuprous chloride (CuCl) produced from the metallic Cu, hydrogen gas naturally used in the reduction of cupric chloride ($CuCl_2$) is utilized, so that the amount of hydrogen gas is decreased by the increment of Cu super-micro powder.

$$CuCl_2 + Cu \rightarrow 2CuCl$$

$$2CuCl + H_2 \rightarrow 2Cu + 2HCl$$

The results of Experiment 1 shows that the cheap metal chloride having a large valence and the elemental metal are used instead of the expensive metal chloride having a large valence as the starting material for the metal super-micro powder, and means that it is possible to largely decrease the cost of the starting material for the metal super-micro powder. Further, the fact that the hydrogen gas required for the reduction is equal to that of using the metal chloride having a small valence as the starting material overcomes a drawback that the specific consumption of hydrogen gas is high as a serious problem in the conventional production technique using the metal chloride having a large valence as the starting material.

(Experiment 2)

Figure 2:
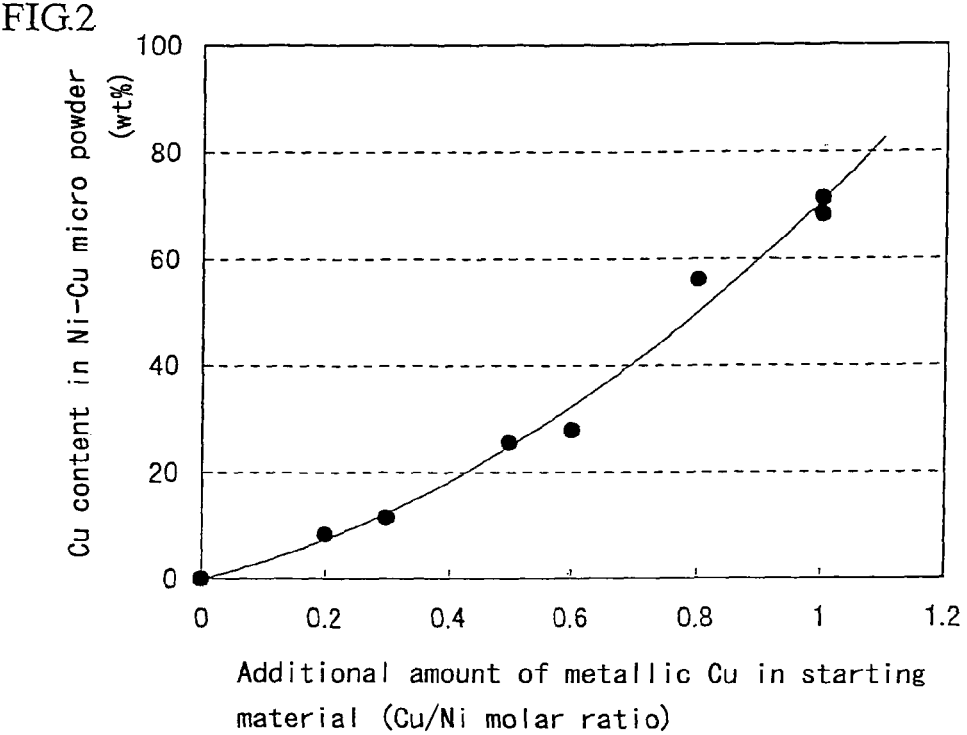
FIG. 2 is a graph showing a relation between metallic Cu addition amount in the production of Ni—Cu alloy super-micro powder and Cu content in the resulting micro powder.
Figure 3:
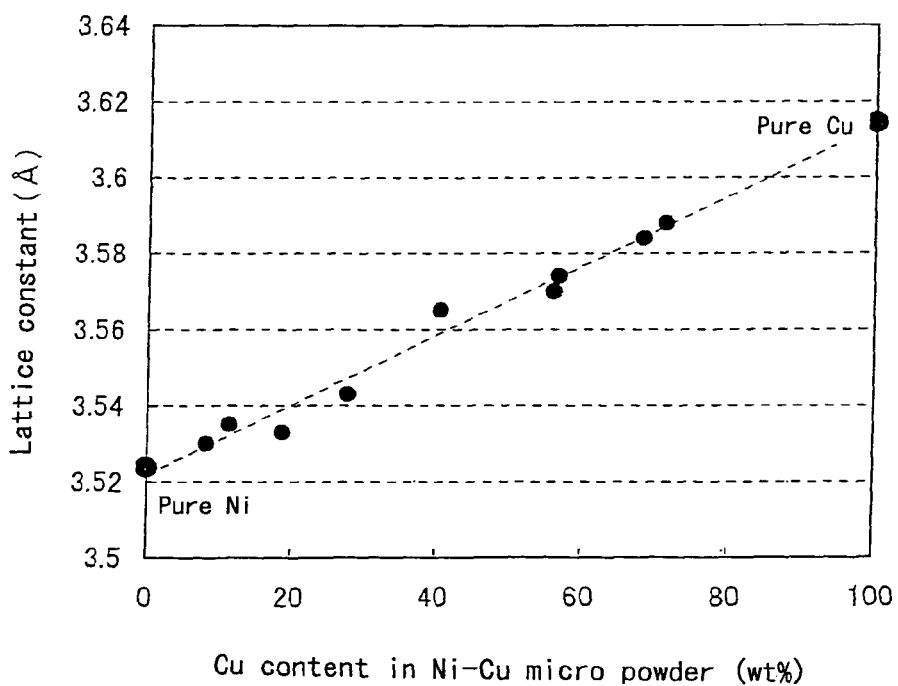
FIG. 3 is a graph showing a relation between Cu content and lattice constant in Ni—Cu alloy super-micro powder.

Then, the inventors have thought that when the above phenomenon is applied, if a chloride of a metal A and a metal B different from the metal A constituting the chloride are mixed and used as a starting material, a metal super-micro powder of a mixture of metals A and B is obtained, and conducted an experiment confirming such a thinking. In this experiment, the reduction treatment is made by using nickel chloride ($NiCl_2$) as a chloride of the metal A and powder of metallic Cu as the metal B and variously changing a ratio of metallic Cu to nickel chloride (molar ratio). The experimental conditions and results are shown in Table 2.

ing apparatus. The results are shown in Table 2 and FIG. 2, from which it has been understood that Cu is included in addition to Ni and the content thereof increases as the addition amount of Cu in the starting material (molar ratio) becomes large. Further, the lattice constant of the super-micro powder is measured by an X-ray diffractometry to obtain results as shown in FIG. 3. The lattice constant of the super-micro powder is a middle between the lattice constant of Ni and the lattice constant of Cu and changes substantially linearly together with the Cu content, from which it is understood that the resulting super-micro powder is not a mixed super-micro powder of metal A and metal B but is a uniformly alloyed product of metals A and B. Moreover, the particle size of the resulting alloy super-micro powder is 0.3 µm smaller than 0.4 µm.

The above reduction reaction is guessed to proceed as follows. That is, a part of nickel chloride ($NiCl_2$) vapor generated from the starting material evaporation vessel is reacted with the mixed metallic Cu to produce vapor of cupric chloride ($CuCl_2$) or cuprous chloride (CuCl), and further the vapor of cupric chloride ($CuCl_2$) is reacted with metallic Cu to produce vapor of cuprous chloride (CuCl). As a result, it is considered that the vapor of cuprous chloride (CuCl) and the vapor of nickel chloride ($NiCl_2$) are mixedly existent in the vapor generated from the starting material evaporation vessel, and these vapors are reduced with hydrogen gas to produce an alloy super-micro powder of Ni and Cu.

$$NiCl_2 + Cu \rightarrow CuCl_2 + Ni$$

$$CuCl_2 + Cu \rightarrow 2CuCl$$

$$NiCl_2 + 2Cu \rightarrow 2CuCl + Ni$$

$$2CuCl + H_2 \rightarrow 2Cu + 2HCl$$

$$NiCl_2 + H_2 \rightarrow Ni + 2HCl$$

The results of Experiment 2 shows that in order to produce an alloy super-micro powder consisting of, for example, tungsten and molybdenum, chlorides such as expensive tungsten hexachloride ($WCl_6$) or molybdenum pentachloride ($MoCl_5$) and the like are not used as a starting material, but a cheap

TABLE 2

| No. | Starting materials charged | | | Evaporation temperature (° C.) | Reaction temperature (° C.) | Flow amount of carrier gas (l/min) | Flow amount of hydrogen gas (l/min) | Amount of resulting alloy powder (g) | Amount of resulting alloy powder (g ratio to Ni) | Cu content (%) | Average particle size of powder (µm) |
| --- | --- | --- | --- | --- | --- | --- | --- | --- | --- | --- | --- |
| | Nickel chloride (g)* | Metallic Cu (g) | Cu/Ni (molar ratio) | | | | | | | | |
| 2 | 24.88 (Ni: 11.27) | 2.50 | 0.2 | 1000 | 1000 | 3 | 3 | 11.95 | 1.06 | 8.30 | 0.3 |
| 3 | 27.53 (Ni: 12.47) | 3.58 | 0.3 | 1000 | 1000 | 3 | 3 | 13.72 | 1.10 | 11.40 | 0.3 |
| 4 | 21.60 (Ni: 9.78) | 5.40 | 0.5 | 1000 | 1000 | 3 | 3 | 10.27 | 1.05 | 25.50 | 0.3 |
| 5 | 14.52 (Ni: 6.58) | 4.27 | 0.6 | 1000 | 1000 | 3 | 3 | 7.17 | 1.09 | 27.74 | 0.3 |
| 6 | 13.16 (Ni: 5.96) | 5.16 | 0.8 | 1000 | 1000 | 3 | 3 | 7.15 | 1.20 | 56.00 | 0.3 |
| 7 | 19.61 (Ni: 8.88) | 9.80 | 1.0 | 1000 | 1000 | 3 | 3 | 10.83 | 1.22 | 68.20 | 0.3 |
| 8 | 12.96 (Ni: 5.87) | 6.35 | 1.0 | 1000 | 1000 | 3 | 3 | 7.22 | 1.23 | 71.30 | 0.3 |

*Numeral in parenthesis shows Ni amount in nickel chloride.

As seen from Table 2, the amount of the resulting metal super-micro powder is larger than Ni amount included in nickel chloride ($NiCl_2$) charged, from which it is suggested that Cu super-micro powder is included in the resulting super-micro powder. The Cu content in the super-micro powder is measured by using an ICP emission spectro chemical analyzmetallic tungsten or metallic molybdenum and a metal chloride of cheap other alloying component are mixed as a starting material, whereby the target alloy super-micro powder can be produced. Also, the adjustment of the alloying components can be precisely conducted by changing a compounding ratio of the chloride of the metal A to the metal B in the starting material as seen from FIG. 2. By applying these results can be theoretically produced not only two-component but three or more-component multi-alloy super-micro powders.

As mentioned above, the invention is based on the novel knowledge entirely different from the conventional techniques.

In the production method of pure metal super-micro powder according to the invention, it is preferable to use a metal chloride having a large valence in view of the starting material cost and the specific consumption of hydrogen gas as mentioned above. For example, it is necessary to use a metal chloride having tow or more valence such as cupric chloride ($CuCl_2$), ferric chloride ($FeCl_2$) or the like.

In the method of producing alloy super-micro powder, it is preferable to use a metal chloride having a large valence as a starting material in view of the starting material cost or hydrogen specific consumption likewise the pure metal. However, the similar phenomenon (reduction of chloride of the metal A and formation of chloride of the metal B through the oxidization of the metal B) is caused even in the metal chloride having a small valence (e.g. nickel chloride ($NiCl_2$)), which develops an effect that the chloride of the expensive metal B is not necessarily used.

As the metal chloride capable of using as the starting material for the alloy super-micro powder are mentioned, for example, cupric chloride ($CuCl_2$), cuprous chloride (CuCl), ferric chloride ($FeCl_3$), ferrous chloride ($FeCl_2$), nickel chloride ($NiCl_2$), cobalt chloride ($CoCl_2$), stannous chloride ($SnCl_2$) and the like.

In case of producing the alloy super-micro powder, the metal chlorides corresponding to the number of the alloying components are used in the conventional technique. In the invention, however, at least one of these metal chlorides can be replaced with the elemental metal. On the other hand, when all of the alloying components are replaced with single bodies of metals, there in no chlorine source contributing to the reaction, so that the upper limit of the replacement is (number of alloying components—1).

As the elemental metal usable as the starting material, mention may be made of copper (Cu), iron (Fe), nickel (Ni), cobalt (Co), silver (Ag), tungsten (W), molybdenum (Mo), niobium (Nb), tantalum (Ta), chromium (Cr), vanadium (V), germanium (Ge), antimony (Sb) and the like.

Moreover, the feature that a metal chloride is used as a starting material for what component among the alloying components and an elemental metal is used as a starting material for what component is determined by comparing standard forming energies of the chlorides of the alloying components (metals). When an elemental metal is used as a component (metal) having a large standard forming energy or easily forming a chloride, the formation of the super-micro powder can be carried out efficiently.

EXAMPLE 1

Fe super-micro powder is produced by using a trial apparatus for metal super-micro powder shown in FIG. 1. In the production, ferric chloride as a metal chloride is mixed with metallic iron powder as an elementary metal and the resulting mixture is used as a starting material. A predetermined amount of the starting material is charged into a starting material evaporation vessel, and after an evaporation furnace and a reduction furnace are set to given temperatures, the starting material evaporation vessel is pushed toward an evaporation part of a reactor while flowing carrier gas (Ar gas) and reducing gas ($H_2$ gas), in which vapor of iron chloride generated from the evaporation vessel is transferred to a reducing part with the carrier gas and reduced by the hydrogen gas to produce iron super-micro powder. The production conditions and the results are shown in Table 3. As seen from the results, the invention can be also applied to the production of metal super-micro powder other than Cu.

TABLE 3

| No. | Starting materials charged | | | Evaporation temperature (° C.) | Reaction temperature (° C.) | Flow amount of carrier gas (l/min) | Flow amount of hydrogen gas (l/min) | Amount of resulting Fe powder (g) | Resulting Fe amount/ Fe amount in $FeCl_3$ (%) | Average particle size of powder (µm) |
| --- | --- | --- | --- | --- | --- | --- | --- | --- | --- | --- |
| | A: Ferric chloride (g)* | B: Metallic Fe (g) | B/A (molar ratio) | | | | | | | |
| 11 | 4.83 (Fe: 2.13) | 2.13 | 1.0 | 1000 | 1000 | 3 | 3 | 2.56 | 1.20 | 0.3 |
| 12 | 3.53 (Fe: 1.56) | 7.78 | 5.0 | 1000 | 1000 | 3 | 3 | 1.97 | 1.26 | 0.3 |

*Numeral in parenthesis shows Fe amount in ferric chloride.

EXAMPLE 2

Figure 4:
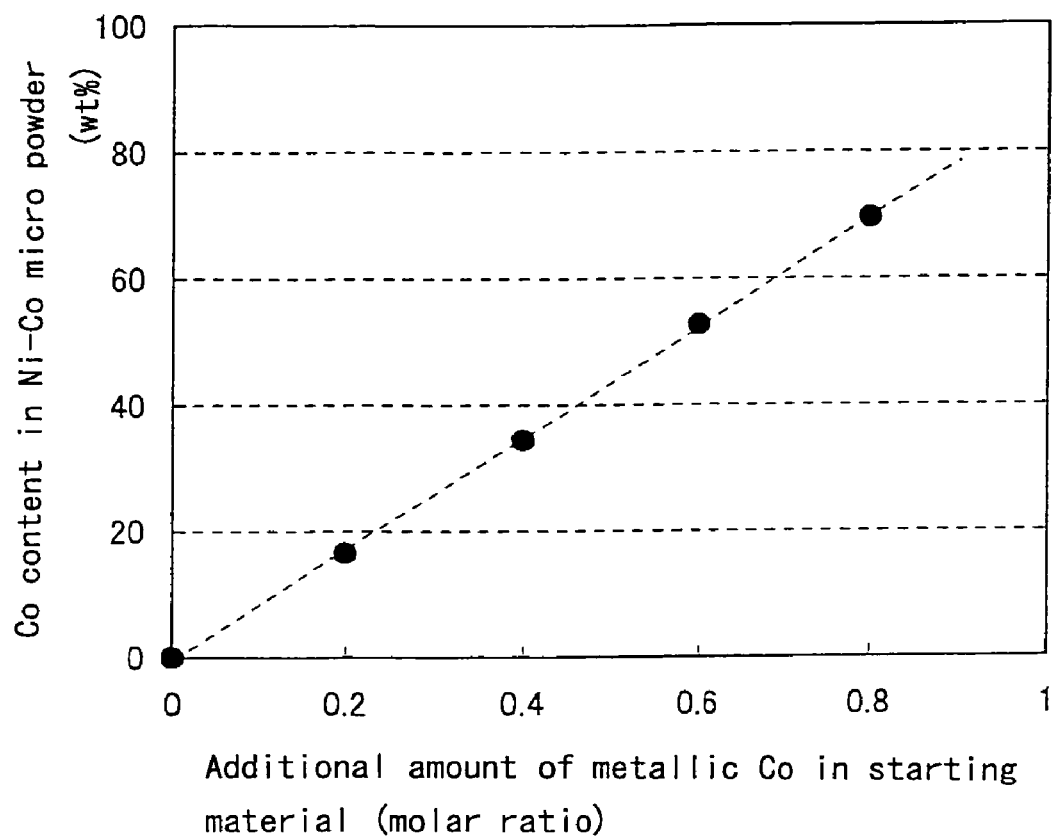
FIG. 4 is a graph showing a relation between metallic Co addition amount in the production of Ni—Co alloy super-micro powder and Co content in the resulting micro powder.

Super-micro powder of Ni alloy is produced by using a trial apparatus for metal super-micro powder shown in FIG. 1. In the starting material, nickel chloride ($NiCl_2$) is used as a metal chloride, and powders of metallic Mo, Nb and Co are used as a metal of an alloying component. The production conditions and the analytical results of the resulting powder components are shown in Table 4. As seen from this table, the target metal components (Mo, Nb, Co) are included in the resulting powder, and the content thereof is high as the compounding amount in the starting material (molar ratio) becomes larger. In FIG. 4 are shown the results in case of using metallic Co powder, which shows that the Co content in the super-micro powder is well interrelated to the amount of metallic Co added in the starting material and the control of the composition can be conducted precisely. Also, the resulting powder is subjected to an X-ray diffractometry to measure a lattice constant, whereby the powder is confirmed to be alloyed. As seen from the above, the invention can be applied to the production of the super-micro powders of not only Ni—Cu alloy but also Ni—Mo alloy, Ni—Nb alloy and Ni—Co alloy, and the composition of the alloy can be controlled by changing the compounding ratio in the starting material.

TABLE 4

| | Starting material charged | | | | | Flow amount of carrier gas (l/min) | Flow amount of hydrogen gas (l/min) | Amount of resulting alloy powder (g) | Amount of resulting alloy powder (g ratio to Ni) | Content of alloying component (%) | Average particle size of powder (µm) |
|---|---|---|---|---|---|---|---|---|---|---|---|
| No. | A: Nickel chloride (g)*1 | B: Elementary metal (g) | B/A (molar ratio) | Evaporation temperature (°C.) | Reaction temperature (°C.) | | | | | | |
| 21 | 9.68 (Ni: 4.38) | Mo: 0.72 | 0.1 | 1000 | 1000 | 3 | 3 | 5.04 | 1.15 | 2.31 | 0.30 |
| 22 | 10.22 (Ni: 4.63) | Mo: 1.51 | 0.2 | 1000 | 1000 | 3 | 3 | 5.56 | 1.20 | 7.58 | 0.30 |
| 23 | 10.66 (Ni: 4.83) | Nb: 0.77 | 0.1 | 1000 | 1000 | 3 | 3 | 5.46 | 1.13 | 5.16 | 0.30 |
| 24 | 10.65 (Ni: 4.82) | Nb: 1.53 | 0.2 | 1000 | 1000 | 3 | 3 | 5.69 | 1.18 | 7.16 | 0.35 |
| 25 | 24.81 (Ni: 11.24) | Co: 2.26 | 0.2 | 1000 | 1000 | 3 | 3 | 11.49 | 1.02 | 16.49 | 0.30 |
| 26 | 22.93 (Ni: 10.39) | Co: 4.17 | 0.4 | 1000 | 1000 | 3 | 3 | 11.40 | 1.10 | 34.32 | 0.30 |
| 27 | 23.08 (Ni: 10.45) | Co: 6.30 | 0.6 | 1000 | 1000 | 3 | 3 | 12.16 | 1.16 | 52.67 | 0.30 |
| 28 | 20.55 (Ni: 9.31) | Co: 7.47 | 0.8 | 1000 | 1000 | 3 | 3 | 11.79 | 1.27 | 69.49 | 0.30 |

*Numeral in parenthesis shows Ni amount in nickel chloride ($NiCl_2$).

EXAMPLE 3

Super-micro powder of Ni—W—Fe three-component alloy is produced by using a trial apparatus for metal super-micro powder shown in FIG. 1. In the starting material, nickel chloride ($NiCl_2$) is used as a metal chloride, and metallic W and Fe powders are used as a metal of alloying component. The production conditions and the analytical results of the resulting powder are shown in Table 5. From the table, it can be seen that the target metal components (W, Fe) are included in the resulting powder. Also, the resulting powder is subjected to an X-ray diffractometry to measure a lattice constant, whereby the powder is confirmed to be alloyed. These results show that the invention can be applied to the production of super-micro powders of not only two-component system but also three-component system.

TABLE 5

| | Starting materials charged | | | | | Flow amount of carrier gas (l/min) | Flow amount of hydrogen gas (l/min) | Amount of resulting alloy powder (g) | Alloy composition (wt %) | | | Average particle size of powder (µm) |
|---|---|---|---|---|---|---|---|---|---|---|---|---|
| No. | A: Nickel chloride (g)* | B: W powder (g) | C: Fe powder (g) | Evaporation temperature (°C.) | Reaction temperature (°C.) | | | | Ni | W | Fe | |
| 31 | 16.48 (Ni: 7.46) | 8.89 | 2.70 | 1000 | 1000 | 3 | 3 | 8.43 | 91.29 | 1.81 | 1.39 | 0.15 |

*Numeral in parenthesis shows Ni amount in nickel chloride.

INDUSTRIAL APPLICABILITY

The invention can be applied to not only the method of producing pure metal and alloy super-micro powders but also the method of producing various products by using plural kinds of starting materials. Also, the pure metal and alloy super-micro powders produced in the invention can be used as not only an electrode material for nickel-hydrogen cell or the like but also an electrically conductive material for the formation of circuits in the filed of various electronic parts.

The invention claimed is:

1. A method of producing super-micro powder of a pure metal having a particle size of not more than 0.4 µm comprising performing a vapor phase chemical reaction including heating a starting material forming metal chloride vapor, the starting material containing metal chloride and elemental metal of the metal contained in the metal chloride, and reducing the metal chloride vapor with hydrogen gas to produce the super-micro powder of a pure metal having a particle size of not more than 0.4 µm.

2. A method of producing super-micro powder of a pure metal according to claim 1, wherein the metal chloride has a valence of at least two.

3. A method of producing super-micro powder of a pure metal according to claim 2, wherein the metal chloride is at least one of $CuCl_2$, $FeCl_3$ and $NiCl_2$.

4. A method of producing super-micro powder of a pure metal according to claim 1, wherein the metal chloride is at least one of $CuCl_2$, $FeCl_3$ and $NiCl_2$.

5. A method of producing super-micro powder of a pure metal according to claim 1, wherein the metal chloride and the elemental metal are mixed.

6. A method of producing super-micro powder of an alloy having a particle size of not more than 0.4 µm comprising performing a vapor phase chemical reaction including heating a starting material forming metal chloride vapor, the starting material containing metal chloride and elemental metal as alloying components; and reducing the metal chloride vapor with hydrogen gas to form the super-micro powder of an alloy having a particle size of not more than 0.4 µm.

7. A method of producing super-micro powder of an alloy according to claim 6, wherein the metal chloride is at least one of $CuCl_2$, CuCl, $FeCl_3$, $FeCl_2$, $NiCl_2$, $CoCl_2$ and $SnCl_2$.

8. A method of producing super-micro powder of an alloy according to claim 7, wherein the elemental metal is at least one of Cu, Fe, Ni, Co, Ag, W, Mo, Nb, Ta, Cr, V, Ge and Sb.

9. A method of producing super-micro powder of an alloy according to claim 6, wherein the elemental metal is at least one of Cu, Fe, Ni, Co, Ag, W, Mo, Nb, Ta, Cr, V, Ge and Sb.

* * * * *